(12) United States Patent
Anderson et al.

(10) Patent No.: US 7,407,222 B2
(45) Date of Patent: Aug. 5, 2008

(54) VEHICLE BODY STRUCTURE

(75) Inventors: Erik R. Anderson, Plymouth, MI (US); Gary R. Osterberg, Hartland, MI (US); Yasuyuki Mitsuhashi, West Bloomfield, MI (US); John S. Latimer, III, West Bloomfield, MI (US)

(73) Assignee: Nissan Technical Center North America, Inc. MI (US)

( * ) Notice: Subject to any disclaimer, the term of this patent is extended or adjusted under 35 U.S.C. 154(b) by 283 days.

(21) Appl. No.: 11/362,514

(22) Filed: Feb. 27, 2006

(65) Prior Publication Data
US 2007/0200314 A1 Aug. 30, 2007

(51) Int. Cl.
*B60R 27/00* (2006.01)

(52) U.S. Cl. .............................. 296/193.06; 296/193.05; 296/193.12

(58) Field of Classification Search ............ 296/193.05, 296/193.06, 193.12, 210
See application file for complete search history.

(56) References Cited

U.S. PATENT DOCUMENTS

| | | | |
|---|---|---|---|
| 4,883,310 A | 11/1989 | Miyazaki et al. | |
| 5,100,197 A | 3/1992 | Ichinose et al. | |
| 5,374,099 A | 12/1994 | Huyer | |
| 5,681,076 A | 10/1997 | Yoshii | |
| 5,873,618 A | 2/1999 | Ejima | |
| 6,578,909 B1 | 6/2003 | Reed et al. | |
| 2001/0033096 A1* | 10/2001 | Hanyu | 296/203.01 |

* cited by examiner

*Primary Examiner*—Lori L Lyjak
(74) *Attorney, Agent, or Firm*—Global IP Counselors

(57) ABSTRACT

A vehicle body structure includes longitudinally extending elements such as roof side rail outer and inner members, a reinforcement member and a gusset that are part of a side impact energy management system for vehicles that include a sunroof. A laterally extending cross member is connected to the roof side rail members, and the roof side rail members are connected to an upper portion of an approximately vertical B-pillar. The cross-member is connected to the roof side rail members approximately perpendicular to the B-pillar, but longitudinally offset from the B-pillar. The reinforcement member extends between the roof side rail members to the cross-member.

34 Claims, 15 Drawing Sheets

VEHICLE BODY STRUCTURE

BACKGROUND OF THE INVENTION

1. Field of the Invention

The present invention generally relates to reinforcement of a vehicle body structure. More specifically, the present invention relates to a vehicle support structure that includes a sunroof.

2. Background Information

A variety of vehicle body constructions are broadly classified into two categories: (1) a unibody or unitized construction in which a self-supporting body has a plurality of rigidity members integrated therewith; and (2) a frame on chassis or framed construction in which a separate body is connected to a structural framework. The framed construction is mainly applied to commercial vehicles and trucks. Most passenger vehicles utilize a conventional unitized (self-supporting) vehicle body that is built from sheet metal components onto which body panels are welded. Generally, the structural configurations of these unitized vehicle bodies are continuously being improved for a variety of reasons. For instance, these unitized vehicle bodies have been developed so as to simplify the assembly process, and thereby reducing manufacturing costs. Moreover, these unitized vehicle bodies have been extensively redesigned over the years to improve the strength and rigidity of the vehicle in the event of impact from the side.

In the case of vehicle roof structures, a center cross member is typically included as part of the roof structures beneath a roof panel of the vehicle to provide lateral support as well as to support the roof panel. The center cross member is often positioned at a point coinciding with the B-pillars of the roof support structure. The B-pillars are typically upright support structures supporting the roof and doors at a location between front and rear side windows of the vehicle. However, when a sunroof is included in the vehicle roof support structure, the center cross member is often repositioned such that the center cross member is longitudinally offset from the B-pillars. Specifically, instead of joining side rail members at a point coinciding with the B-pillars, the center cross member joins the side rail members rearward from the B-pillars. Thus, the transfer of load across the roof during side impact can be less effective for sunroof vehicles.

In view of the above, it will be apparent to those skilled in the art from this disclosure that there exists a need for an improved vehicle support structure for roof structures with a sunroof. This invention addresses this need in the art as well as other needs, which will become apparent to those skilled in the art from this disclosure.

SUMMARY OF THE INVENTION

One object of the present invention is to provide a vehicle support structure that includes reinforcement features when the center cross member is offset from the center pillar.

Another object of the present invention is to provide a vehicle support structure that includes a sunroof and reinforcement features in regions proximate the sunroof to increase rigidity of the vehicle support structure.

In accordance with one aspect of the present invention, a vehicle body structure includes a generally horizontal roof panel having a side edge portion, a body side outer panel, a vertically extending center pillar outer member, a longitudinally extending roof side rail outer member, a longitudinally extending roof side rail inner member, and a longitudinally extending reinforcement member. The body side outer panel is fixedly coupled to the roof panel and extends generally downward from the side edge portion of the roof panel to form a corner area. The vertically extending center pillar outer member includes a generally vertical extending pillar portion and a generally horizontal extending upper pillar portion located at an upper end of the vertical extending pillar portion in the corner area. The upper pillar portion has a generally overall U-shaped transverse cross section with an upper end section and a lower end section. The longitudinally extending roof side rail outer member has a generally overall U-shaped transverse cross section positioned at the corner area. The roof side rail outer member has a first side rail outer portion fixedly coupled to the upper end section of the upper pillar portion and a second side rail outer portion fixedly coupled to the lower end section of the upper pillar portion. The longitudinally extending roof side rail inner member has a first side rail inner portion fixedly coupled to the first side rail outer portion and a second side rail inner portion fixedly coupled to the second side rail outer portion and the lower end section of the upper pillar portion. The longitudinally extending reinforcement member has a generally overall U-shaped cross section that includes a first edge portion connected to the first side rail outer portion and a second edge portion connected to the second side rail outer portion. The reinforcement member extends generally perpendicular to the center pillar outer member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
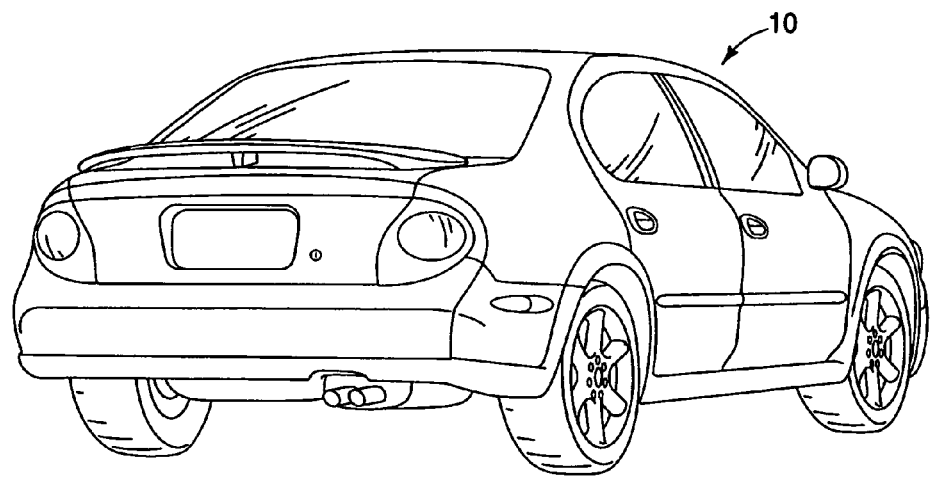
FIG. 1 is a perspective view of a vehicle that includes a vehicle support structure in accordance with the present invention.
Figure 2:
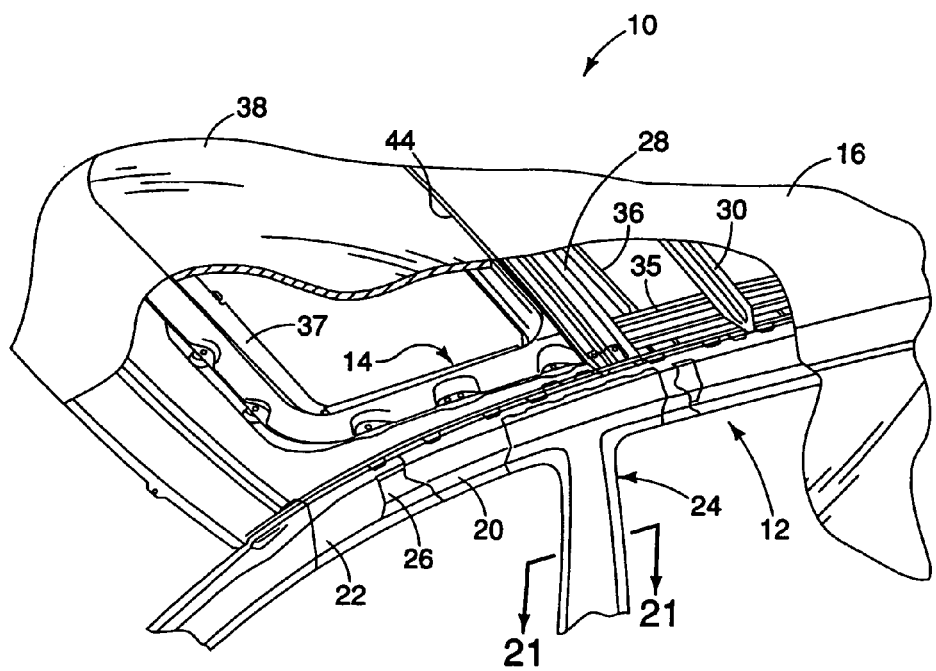
FIG. 2 is a fragmentary perspective view of the vehicle depicted in FIG. 1 with portions of a roof panel and body side outer panel cutaway to reveal portions of the vehicle support structure in accordance with the present invention.

Referring initially to FIGS. 1 and 2, a vehicle 10 is illustrated that includes a vehicle body structure 12 in accordance with a preferred embodiment of the present invention. As shown in FIG. 2, the vehicle body structure 12 includes structural reinforcements in regions adjacent to a sunroof support structure 14, as described in greater detail in below.

Figure 3:
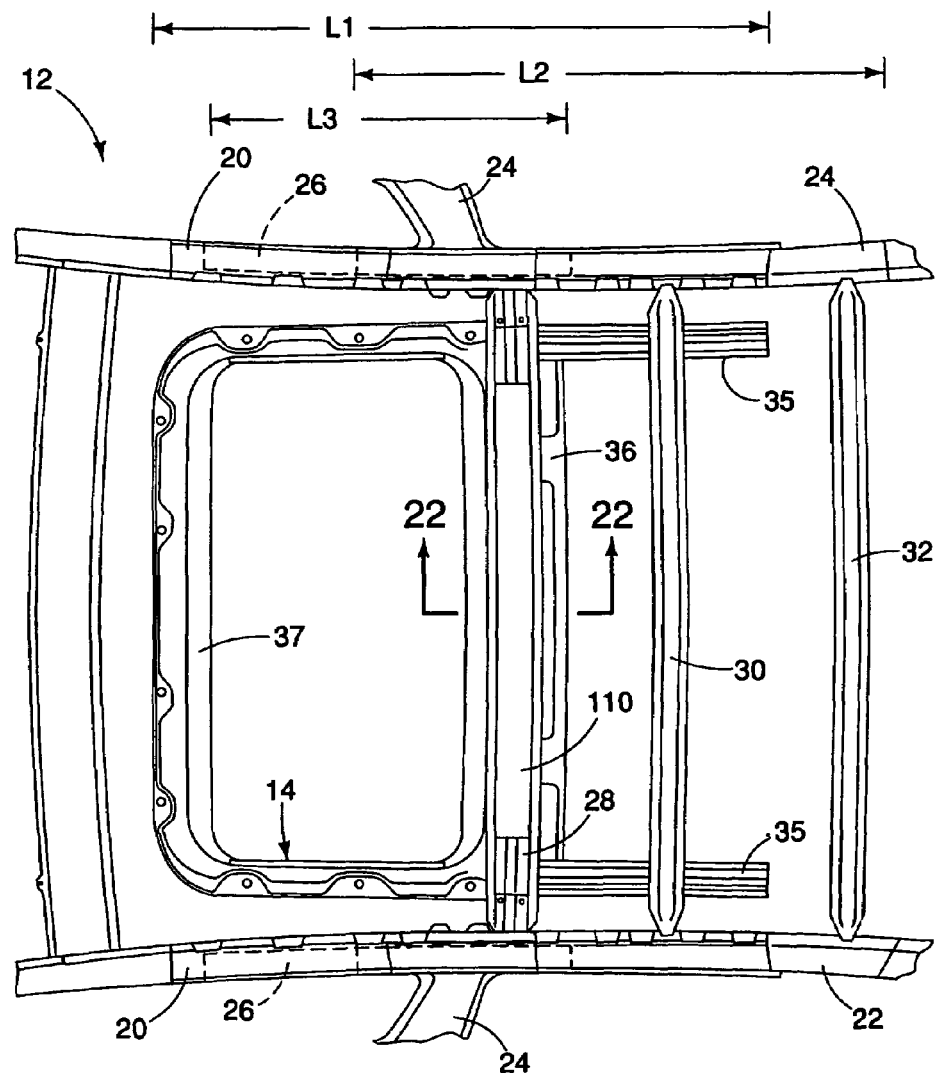
FIG. 3 is a fragmentary top plan view of the vehicle support structure with the roof panel and body side outer panels completely removed to show the support structure in accordance with the present invention.
Figure 4:
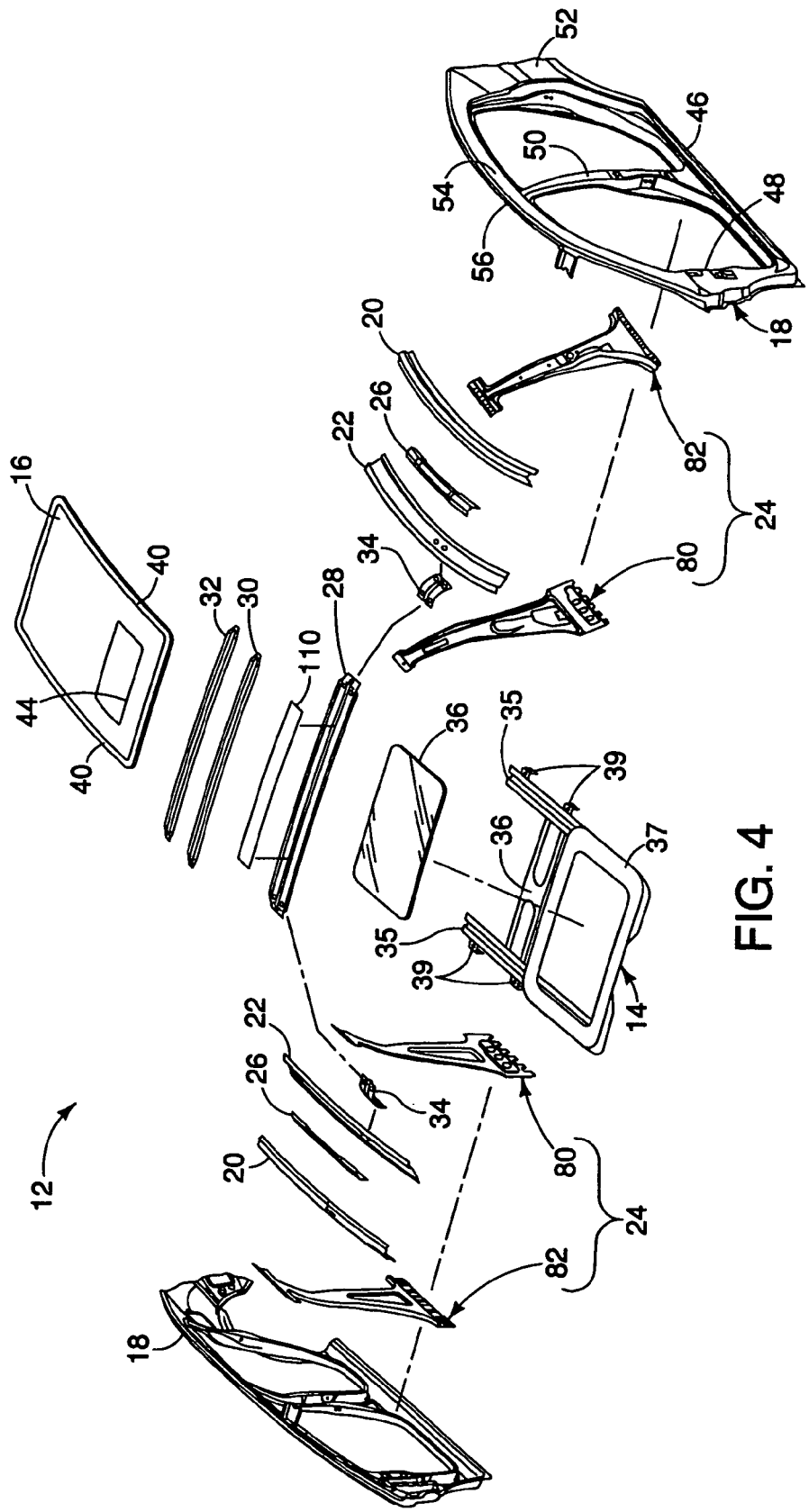
FIG. 4 is an exploded perspective view of the vehicle support structure showing various portions of the vehicle support structure in accordance with the present invention.
Figure 5:
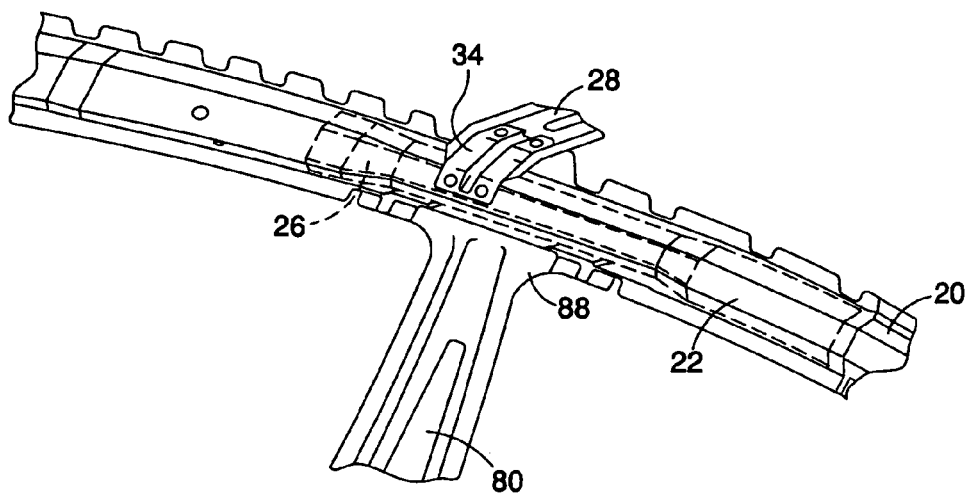
FIG. 5 is fragmentary inside perspective view of a part of the vehicle support structure showing a gusset, a reinforcement member, a roof side rail inner member, a roof side rail outer member and a pillar structure in accordance with the present invention.
Figure 6:
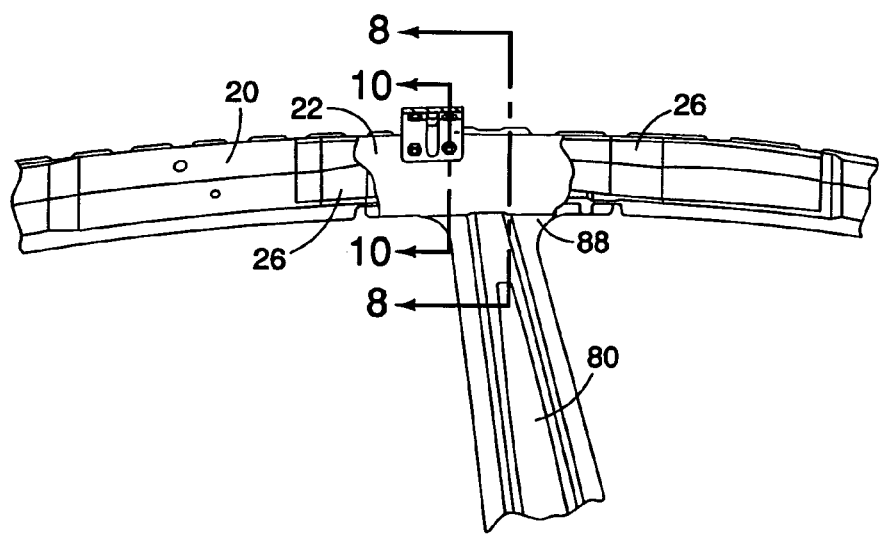
FIG. 6 is a fragmentary inside elevational view of a part of the vehicle support structure showing the gusset, the reinforcement member, the roof side rail inner member, the roof side rail outer member and the pillar structure in accordance with the present invention.

With specific reference to FIGS. 2, 3 and 4, a general description of the vehicle body structure 12 is now provided. It should be understood from the drawings and description herein that various portions and components of the vehicle body structure 12 have been omitted for the sake of brevity and clarity. For example, floor, trunk, firewall, windshield, rear window, doors and engine compartment related portions, among others of the vehicle body structure 12 have been intentionally omitted in order to focus on mainly those elements and components of vehicle body structure 12 related to or peripheral to the present invention.

The vehicle body structure 12 basically includes (among other elements and portions) a generally horizontal roof panel 16 (shown in FIGS. 2 and 4), a pair of body side outer panels 18, a pair of roof side rail outer members 20, a pair of roof side rail inner members 22 (FIGS. 2 and 4), a pair of center pillar structures 24, a pair of reinforcement members 26, a center cross member 28, a pair of cross bows 30 and 32, and a pair of gussets 34 (FIG. 4). Each portion of the vehicle body structure 12 is preferably made of a metallic material, but can alternatively be made of other suitable materials with similar strength and rigidity. The center cross member 28 is a generally horizontally extending member and the center pillar structures 24 are generally vertically extending. Each center pillar structure 24 defines a generally vertical central axis. Moreover, the center cross member 28 is longitudinally offset from the central axis of the center pillar structures 24 that constitutes part of the so called B-pillars. More specifically, the center cross member 28 is longitudinally rearward from the B-pillars.

Since the various elements on either side of vehicle body structure 12 are generally symmetrical to one another, only elements on one side of the vehicle body structure 12 are described herein below. However it should be understood from the drawings and the description herein that description of an element or portion on one side of the vehicle body structure 12 applies to both sides. For instance, the body side outer panels 18 are generally symmetrical to one another and generally include common features portions. Therefore, a description of only one of the body side outer panels 18 is included herein below. Similarly only one roof side rail outer member 20, one roof side rail inner member 22, one pillar structure 24, one reinforcement member 26 and one gusset 34 are described herein below with description of one applying to both sides of the vehicle body structure 12.

Still with reference to FIGS. 2, 3 and 4, a description of the sunroof support structure 14 is now provided. The sunroof support structure 14 basically includes a pair of tracks 35, a sunroof cross member 36, an operating mechanism (not shown), a rectangular framing member 37, a sliding sunroof panel 38 and attachment gussets 39. The sunroof support structure 14 is a conventional structure that is configured to allow movement of the sliding sunroof panel 38 along the tracks 35 such that the sliding sunroof panel 38 can move in and out of the framing member 37 between a closed orientation and an open orientation. The attachment gussets 39 are curved or angled bracket-like portions that can include either bolt holes or welding surfaces for fixed attachment to the vehicle body structure 12. Specifically, the attachment gussets 39 can be fixedly attached to the roof side rail inner member 22.

With reference now to FIGS. 2 and 4, a description of the roof panel 16 is now provided. Among other features, the roof panel 16 includes longitudinally extending side edge portions 40 and a sunroof opening 44. With the sunroof support structure 14 installed in the vehicle body structure 12, the framing member 37 is generally aligned with and surrounds the sunroof opening 44 of the roof panel 16. The sliding sunroof panel 38 and sunroof support structure 14 is configured such that the sliding sunroof panel 38 fits snugly in the sunroof opening 44 of the roof panel 16 in the closed orientation and moves down and back along the tracks 35 away from the sunroof opening 44 in a conventional manner to the open orientation.

As shown in FIG. 4, the body side outer panel 18 basically includes a sill section 46 (optional), a plurality of pillar sections 48, 50 and 52, an upper rail section 54 and an upper attachment flange 56. The pillar section 48 corresponds generally to a conventional A-pillar of the vehicle 10. The pillar section 50 generally corresponds to a conventional B-pillar of the vehicle 10. More specifically, the pillar structure 24 and the pillar section 50 of the body side outer panel 18 generally define the B-pillar of the vehicle 10. Similarly, the pillar section 52 corresponds generally to a C-pillar of the vehicle 10.

Figure 7:
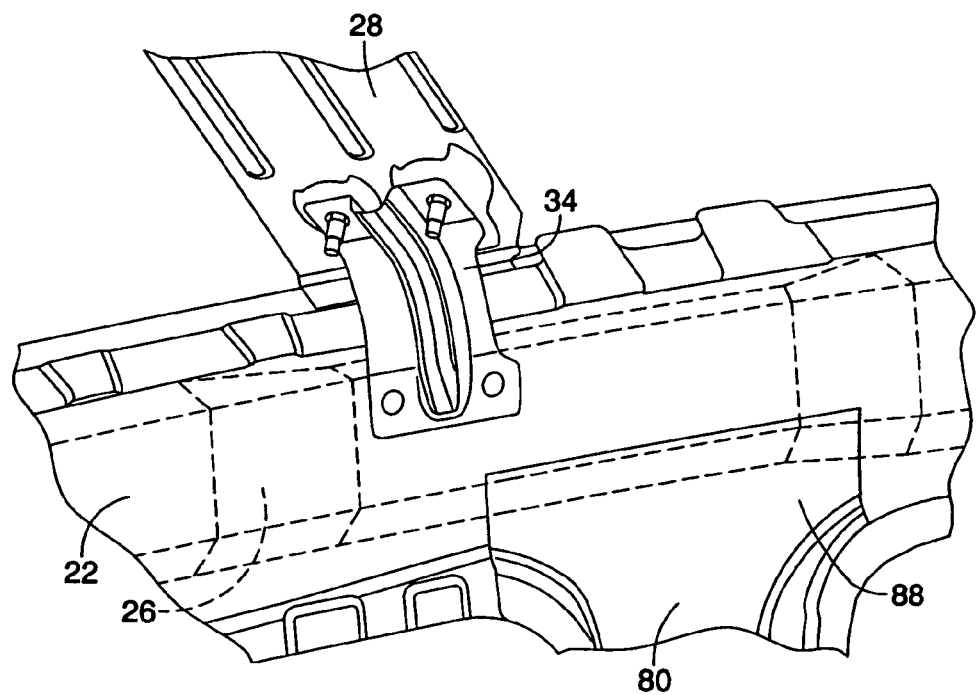
FIG. 7 is a fragmentary inside perspective view looking outward and upward from within the support structure showing the gusset, the reinforcement member, the roof side rail inner member and the pillar structure in accordance with the present invention.
Figure 8:
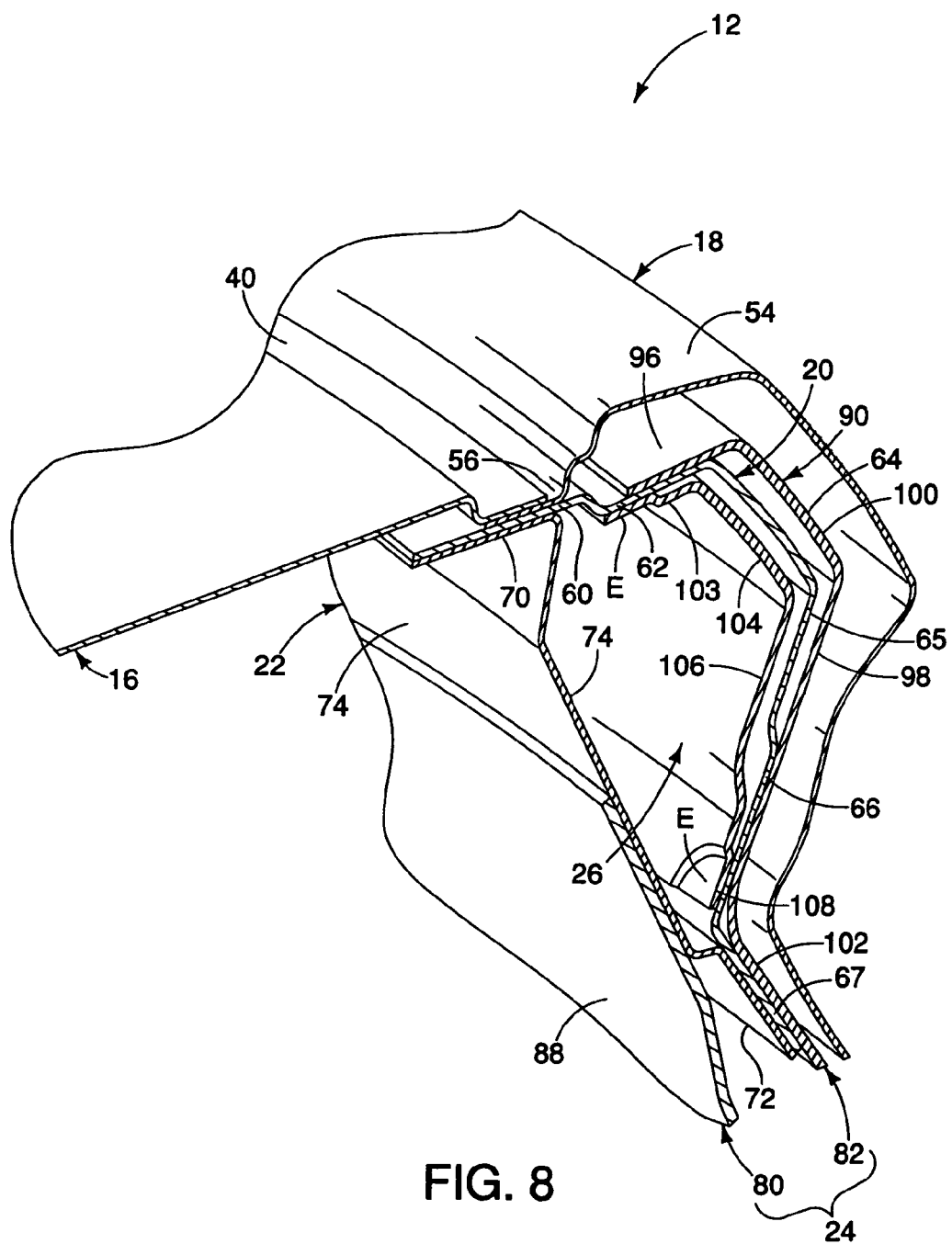
FIG. 8 is a perspective cross-sectional view of a part of the vehicle support structure taken along section line 8-8 in FIG. 6 showing the roof panel, the reinforcement member, the roof side rail inner member, the roof side rail outer member and the pillar structure in accordance with the present invention.

As shown in FIG. 8, the roof panel 16 and the body side outer panel 18 are fixedly attached to one another thereby defining a corner area in the region of their intersection. More specifically, the side edge portion 40 of the roof panel 16 is welded or otherwise bonded to the upper attachment flange 56 of the body side outer panel 18. Since the roof panel 16 is generally horizontal and the body side outer panel 18 extends generally downward, the corner area is formed. FIGS. 5, 6, 7 and 8 show the various connections of the vehicle body structure 12 within the corner area, as described in greater detail below. However, FIGS. 5, 6 and 7 also show the corner area from the inside of the vehicle 10 but with the roof panel 16 and the body side outer panel 18 removed for greater clarity.

Figure 9:
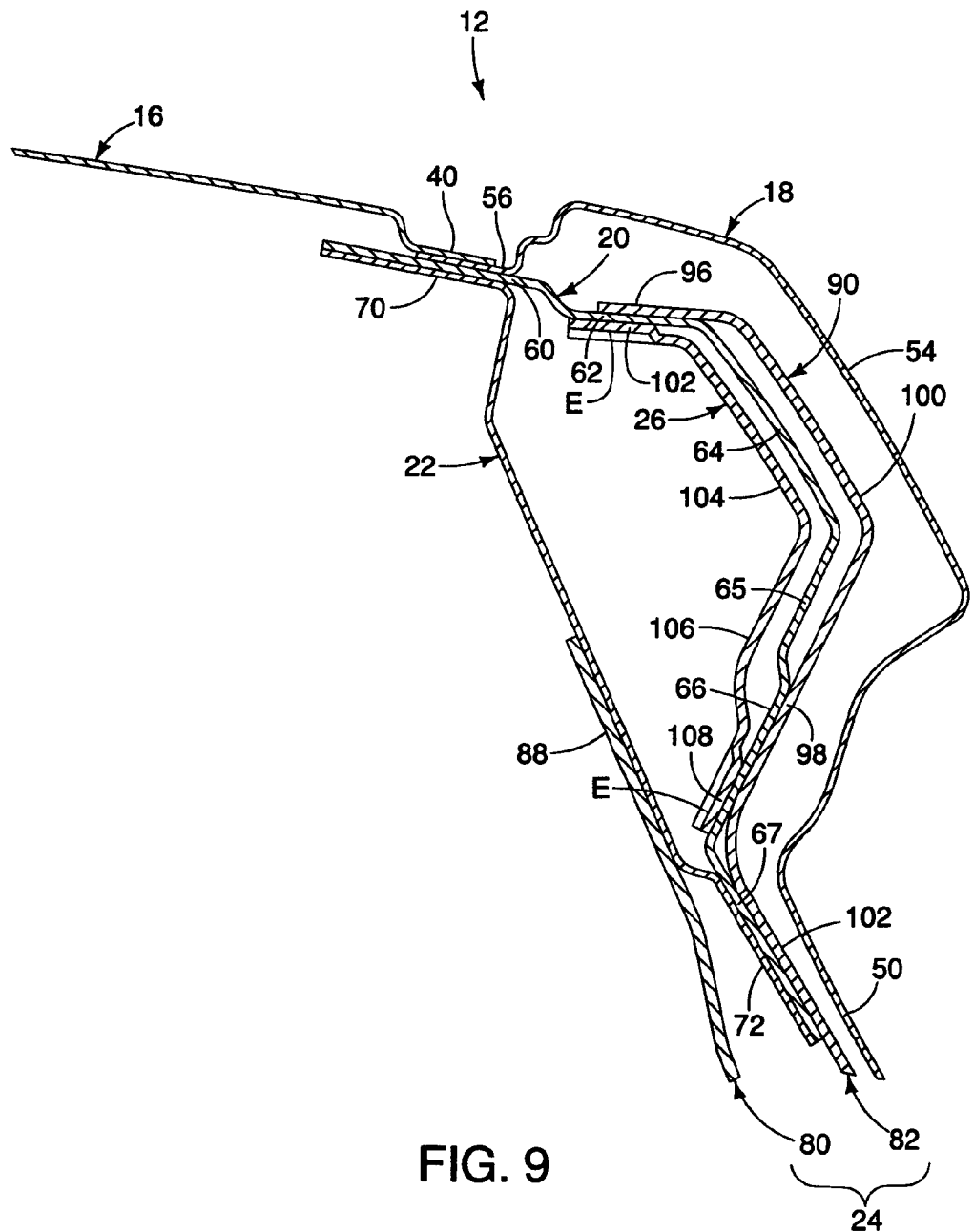
FIG. 9 is a transverse cross-sectional view of a part of the vehicle support structure taken along section line 8-8 in FIG. 6 showing the roof panel, the reinforcement member, the roof side rail inner member, the roof side rail outer member and the pillar structure in accordance with the present invention.
Figure 10:
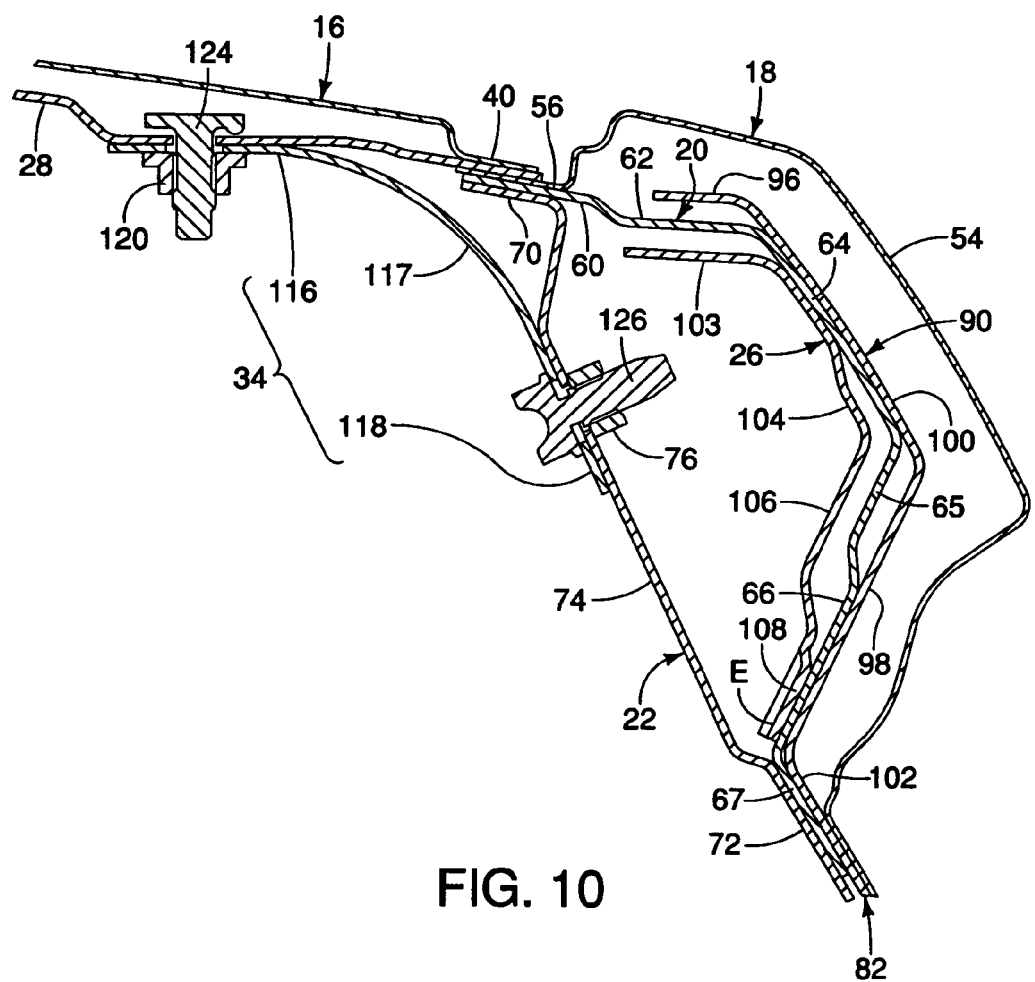
FIG. 10 a transverse cross-sectional view of a part of the vehicle support structure taken along section line 10-10 in FIG. 6 showing the roof panel, the gusset, the reinforcement member, the roof side rail inner member, the roof side rail outer member and the pillar structure in accordance with the present invention.

With specific reference to FIGS. 9, 10, 11 and 13, the roof side rail outer member 20 is an elongated structural member having a generally overall U-shaped cross section, as indicated in FIGS. 9 and 10. The roof side rail outer member 20 basically includes a first side rail outer portion 60, a second side rail outer portion 62, a mid portion 64, a first side offset rail outer portion 65, a second offset portion 66 and a third side rail outer portion 67. The overall U-shaped cross section of the roof side rail outer member 20 is generally defined by the first side rail outer portion 60, the second side rail outer portion 62 and the mid portion 64. As indicated in FIG. 3, the roof side rail outer member 20 has a length $L_1$ and extends along the side of the vehicle body structure 12 from an area forward of the sunroof opening 44 to an area between the bows 30 and 32 rearward of the reinforcement member 26. Most of the first side rail outer portion 60 is directly welded or otherwise bonded to the upper flange attachment flange 56 of the body side outer panel 18, as shown in FIGS. 8 and 9. As shown in FIG. 10, an end of the cross member 28 extends between the first side rail outer portion 60 and the upper flange attachment flange 56, as described in greater detail below.

Figure 11:
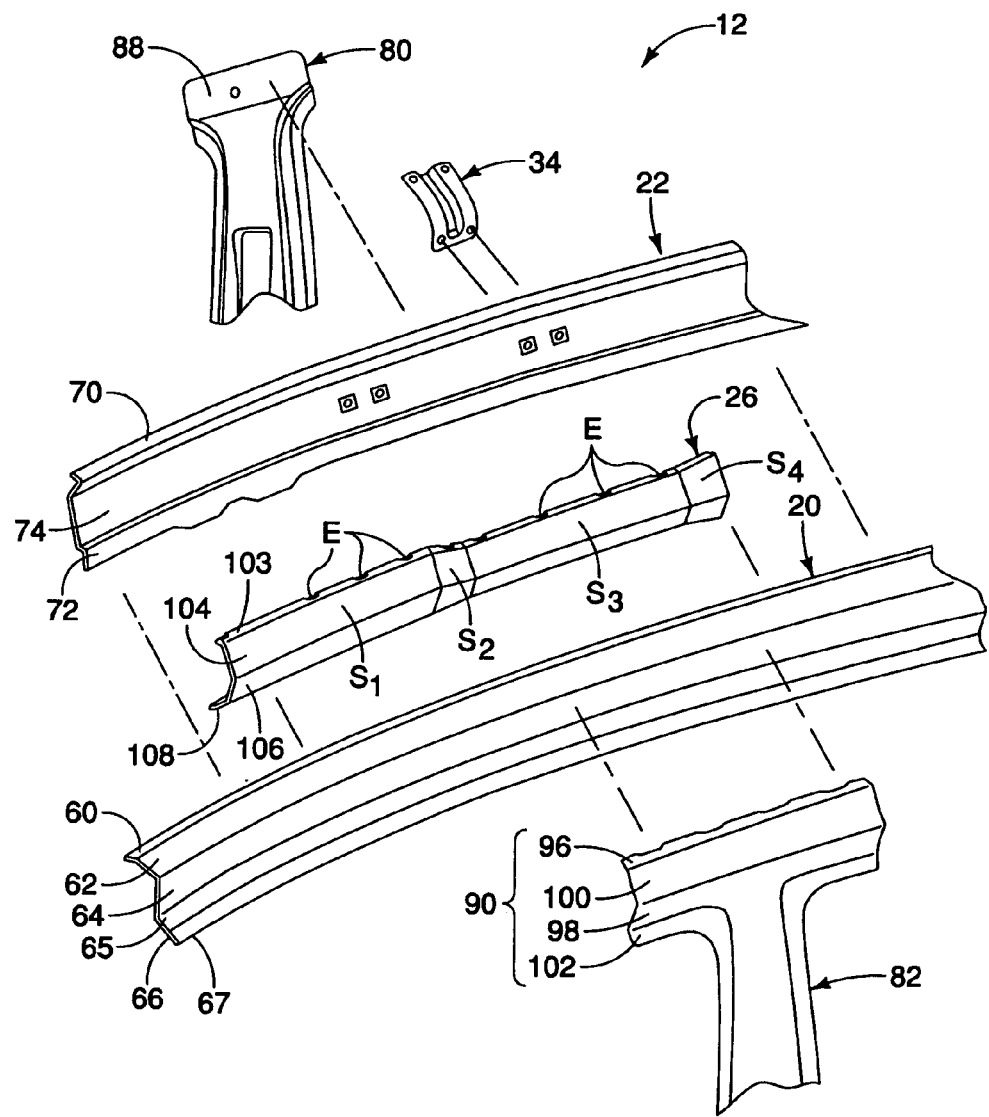
FIG. 11 is an exploded perspective view of a selected parts of the vehicle support structure showing the gusset, the reinforcement member, the roof side rail inner member, the roof side rail outer member and the pillar structure in accordance with the present invention.
Figure 16:
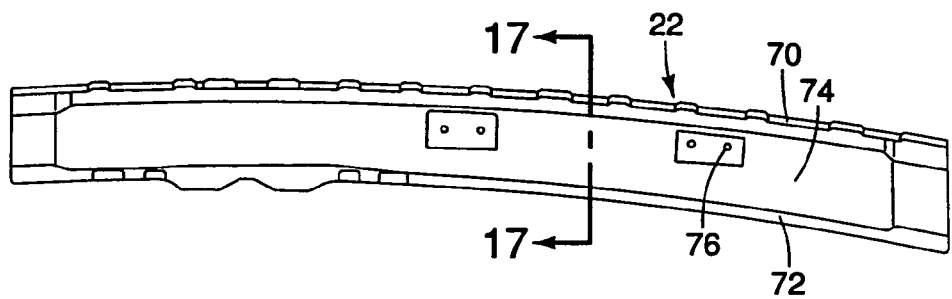
FIG. 16 is a side view of the roof side rail inner member shown removed from the support structure in accordance with the present invention.
Figure 17:
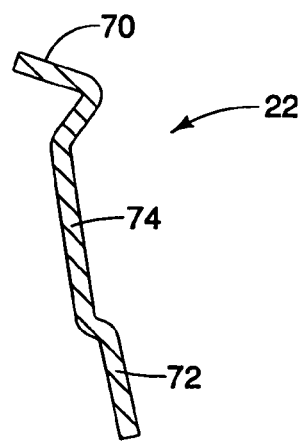
FIG. 17 is a transverse cross sectional view of the roof side rail inner member taken along section line 17-17 in FIG. 16.

With specific reference to FIGS. 11, 16 and 17 the roof side rail inner member 22 is now describe in greater detail. The roof side rail inner member 22 basically includes a first side rail inner portion 70, a second side rail inner portion 72 and a mid side rail inner portion 74. The second side rail inner portion 72 and the mid side rail inner portion 74 of the roof side rail inner member 22 are generally flat portions, with the first side rail inner portion 70 being angularly offset from the second side rail inner portion 72 and the mid side rail inner portion 74. Further, the mid side rail inner portion 74 extends generally parallel to the second side rail inner portion 72, as shown in FIG. 17. However, the mid side rail inner portion 74 is slightly offset from the second side rail inner portion 72 as shown in cross-section in FIG. 17. The mid side rail inner portion 74 includes threaded fastener apertures 76. As indicated in FIG. 3, the roof side rail inner member 22 has a length $L_2$ and extends along the side of the vehicle body structure 12 from an area approximately in the middle of the sunroof opening 44 to an area rearward of the bows 30 and 32.

As indicated in FIG. 3, the roof side rail outer member 20 and the roof side rail inner member 22 overlap one another in a longitudinal direction of the vehicle 10. Specifically, the roof side rail outer member 20 extends from a point forward from the roof side rail inner member 22 and the roof side rail inner member 22 extends rearward beyond the end of the roof side rail outer member 20. An indication of the overlapping regions of the roof side rail outer member 20 and the roof side rail inner member 22 is indicated by the overlapping indication of their respective lengths $L_1$ and $L_2$. In their common overlapping regions, the roof side rail outer member 20 and the roof side rail inner member 22 are welded or otherwise bonded to one another. As shown in FIGS. 8 and 9, the first side rail outer portion 60 and the first side rail inner portion 70 are welded or otherwise bonded together along their entire overlapping length. Similarly, the third side rail outer portion 67 and the second side rail inner portion 72 are welded or otherwise bonded together to form a hollow beam that provides strength and rigidity to the corner area defined between the roof panel 16 and the body side outer panel 18. As shown in FIGS. 8 and 9, the side edge portion 40 of the roof panel 16, the upper attachment flange 56 of the body side outer panel 18, the first side rail outer portion 60 of the roof side rail outer member 20 and the first side rail inner portion 70 of the roof side rail inner member 22 are all respectively overlap one and other and are welded or otherwise bonded together.

It should be understood from the drawings and the description herein that forward and rearward ends of the roof side rail outer member 20 and the roof side rail inner member 22 are fixedly attached to conventional structural elements of the vehicle 10 that are not depicted or described for the sake of brevity.

Figure 21:
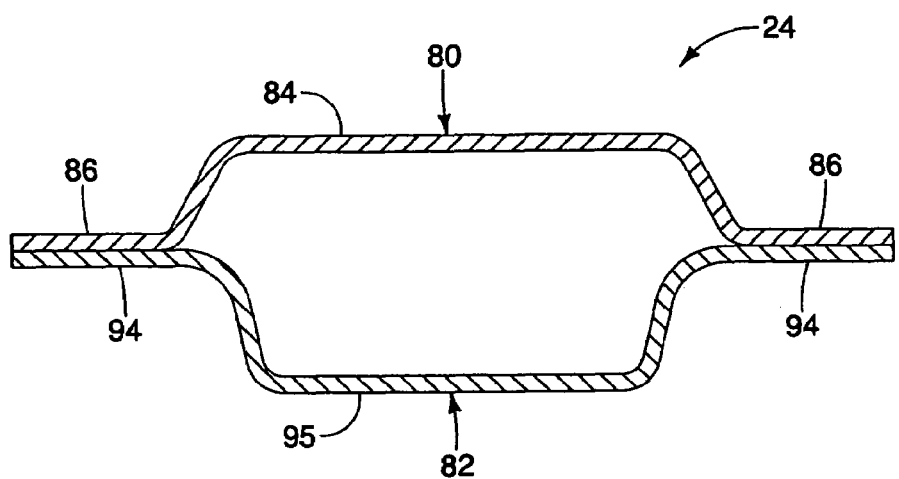
FIG. 21 is a transverse cross sectional view of the pillar structure taken along section line 21-21 in FIG. 2.

With specific reference to FIGS. 4, 12, 18 and 19, the pillar structure 24 is now described. The pillar structure 24 is a hollow column having a closed transverse cross-section as shown in FIG. 21. The pillar structure 24 extending from the region of the sill section 46 of the body side outer panel 18 to the side edge portion 40 of the roof panel 16. The pillar structure 24 basically includes a center pillar inner panel 80 and a center pillar outer panel 82.

Figure 18:
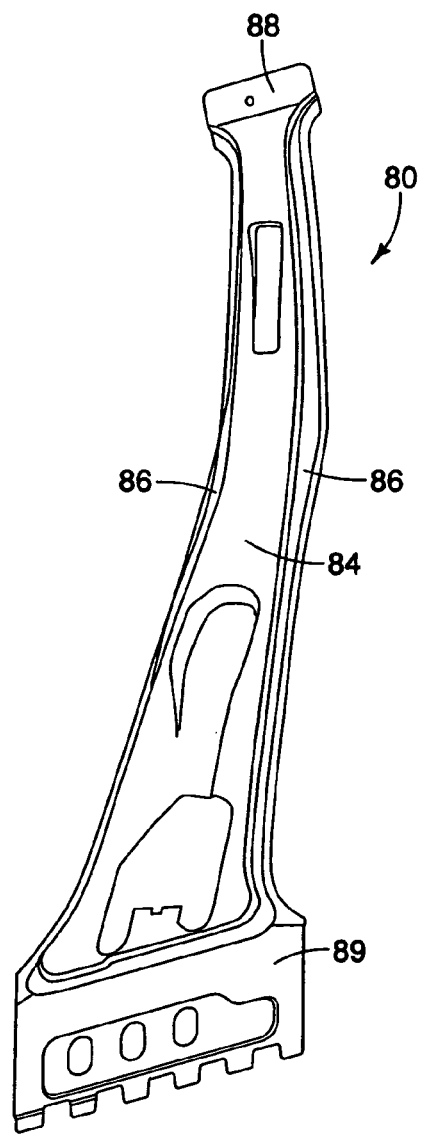
FIG. 18 is a side perspective view of the center pillar inner member of the pillar structure shown removed from the support structure in accordance with the present invention.
Figure 19:
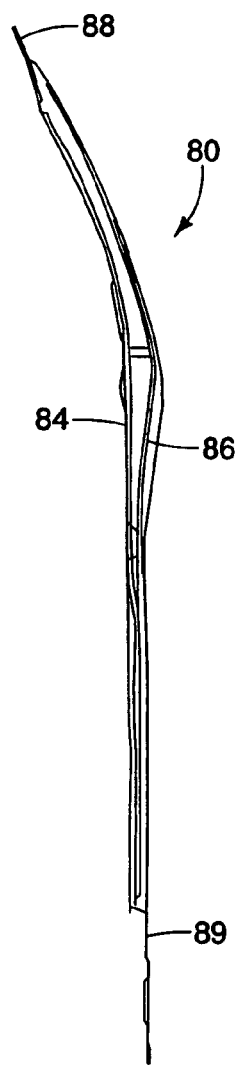
FIG. 19 is a front view of the center pillar inner member in accordance with the present invention.

As shown in FIGS. 18, 19 and 21, the center pillar inner panel 80 is a vertically extending portion of the pillar structure 24 basically includes a central section 84, side flanges 86, an inner panel upper end 88 and an inner panel lower end 89. The central section 84 is offset from the side flanges 86 thereby forming a generally overall U-shape as viewed in cross section, as shown in FIG. 21. Both the central section 84 and the side flanges 86 are shaped with a slight contour in accordance with the shape and contours of the vehicle 10. The inner panel upper end 88 is fixedly attached, welded or otherwise bonded to the roof side rail inner member 22, as shown in FIGS. 5, 6, 7, 9 and 11.

Figure 12:
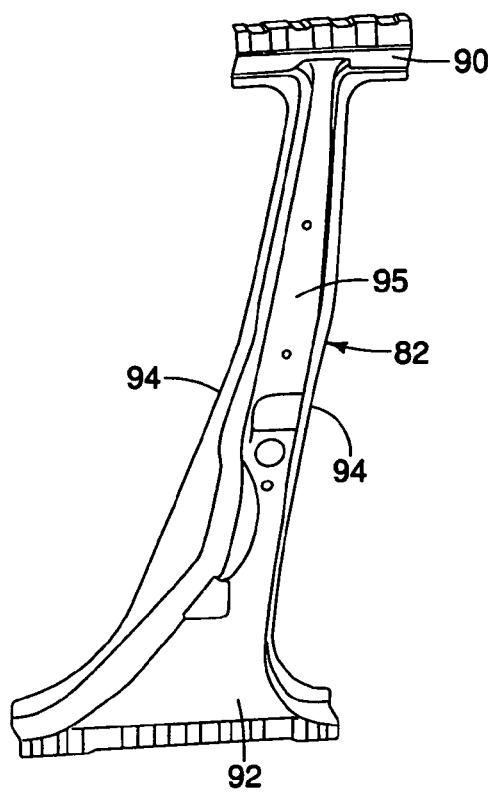
FIG. 12 is an outside perspective view of the center pillar outer member of the pillar structure shown removed from the support structure in accordance with the present invention.
Figure 13:
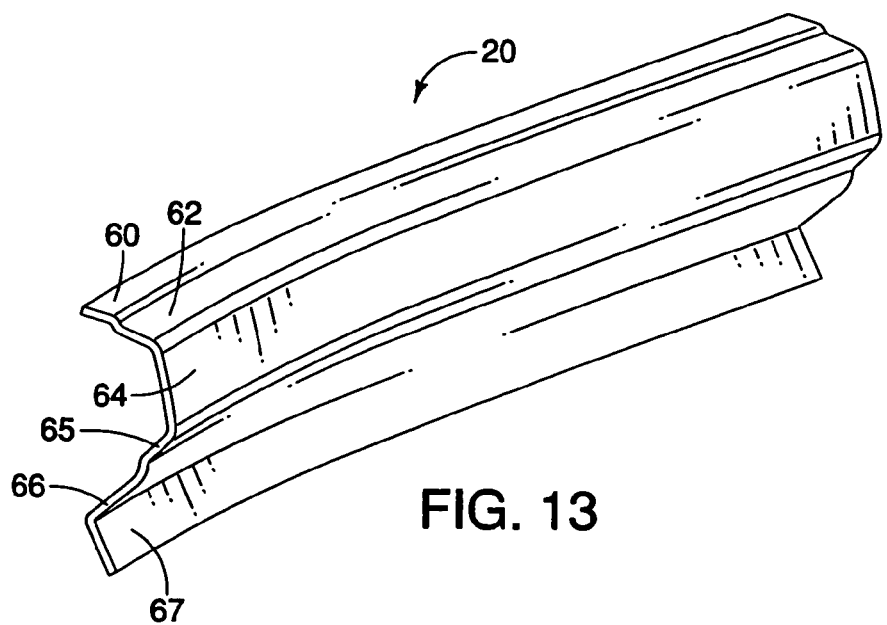
FIG. 13 is an outside perspective view of the roof side rail outer member shown removed from the support structure in accordance with the present invention.

The center pillar outer panel 82 of the pillar structure 24 is now described with specific reference to FIG. 12. The outer panel 82 of the pillar structure 24 basically includes a generally horizontal extending upper pillar portion 90, a lower end section 92 and a generally vertical extending pillar portion formed by a pair of side flanges 94 and a mid section 95. As shown in FIGS. 8 through 11, the upper pillar portion 90 basically includes a first flange section 96, a second flange section 98, a mid-flange section 100 and a flange 102. The first flange section 96, the second flange section 98 and the mid-flange section 100 extend generally horizontally in the corner area such that upper pillar portion 90 has a generally overall U-shaped when viewed cross section as shown in FIGS. 8, 9 and 10. The lower end section 92 is welded to the sill portion 46 of the body side outer panel 18. Both the side flanges 94 and the mid section 95 are shaped with a slight contour in accordance with the shape and contours of the vehicle 10 complimenting the overall shape of the side flanges 86 and the mid section 86 of the center pillar inner panel 80 of vehicle 10 and its associated design features. The side flanges 94 and the mid section 95 extend generally vertically and define a generally overall U-shape in cross-section, as shown in FIG. 21. The side flanges 86 of the inner panel 80 are bonded (for example, welded) to the side flanges 94 of the outer panel 82 thereby forming a closed cross-section, as shown in FIG. 21. Forming the pillar structure 24 with the center pillar inner and outer panels 80 and 82 provides a strong hollow structure to support the roof panel 16 and supporting structure, thereby minimizing deformation resulting from a side impact.

With specific reference to FIGS. 8, 9 and 10, a description is now provided of the fixed coupling between the upper pillar portion 90 of the center pillar outer panel 82 and the roof side rail outer member 20. Specifically as shown in FIGS. 8 and 9, a section of the second side rail outer portion 62 of the roof side rail outer member 20 is welded or otherwise bonded to the first flange section 96 of the center pillar outer panel 82. However as shown in FIG. 10, in the region of the gusset 34 a gap is defined between the second side rail outer portion 62 of the roof side rail outer member 20 and the first flange section 96 of the center pillar outer panel 82.

As shown in FIG. 10, in the region of the gusset 34, a section of the mid portion 64 of the roof side rail outer member 20 is welded or otherwise bonded to the mid-flange section 100 of the center pillar outer panel 82. However as shown in FIGS. 8 and 9, the remainder of the mid portion 64 of the roof side rail outer member 20 is spaced apart from the mid-flange section 100 of the center pillar outer panel 82.

As shown in FIGS. 8, 9 and 10, the first side offset rail outer portion 65 is spaced apart from the second flange section 98 of the center pillar outer panel 82, but the second offset portion 66 is welded or otherwise bonded to the second flange section 98 of the center pillar outer panel 82. Further, the third side rail outer portion 67 is welded to or otherwise bonded to the flange 102 of the center pillar outer panel 82.

Figure 14:
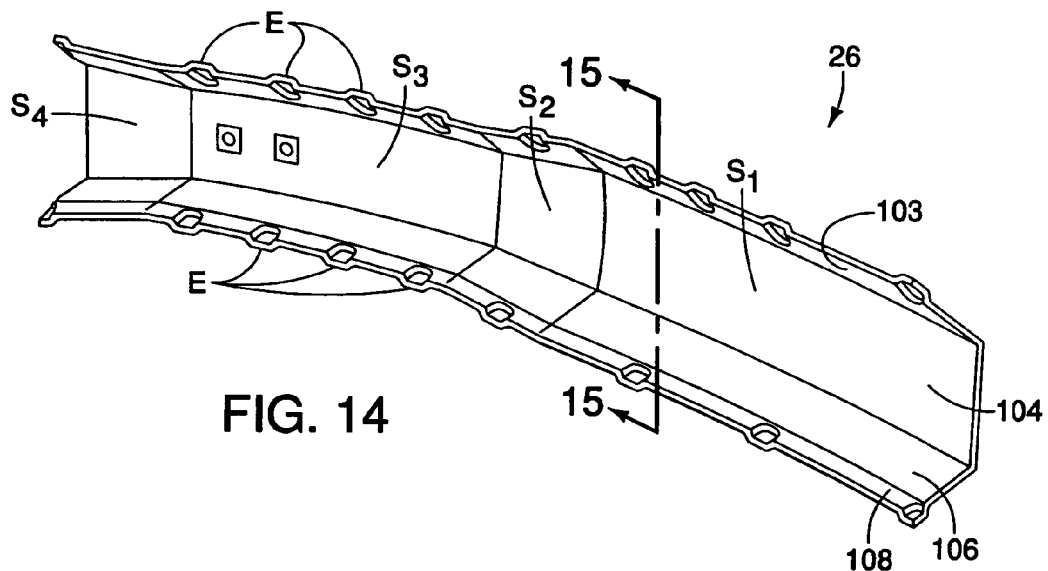
FIG. 14 is an outside perspective view of the reinforcement member shown removed from the support structure in accordance with the present invention.
Figure 15:
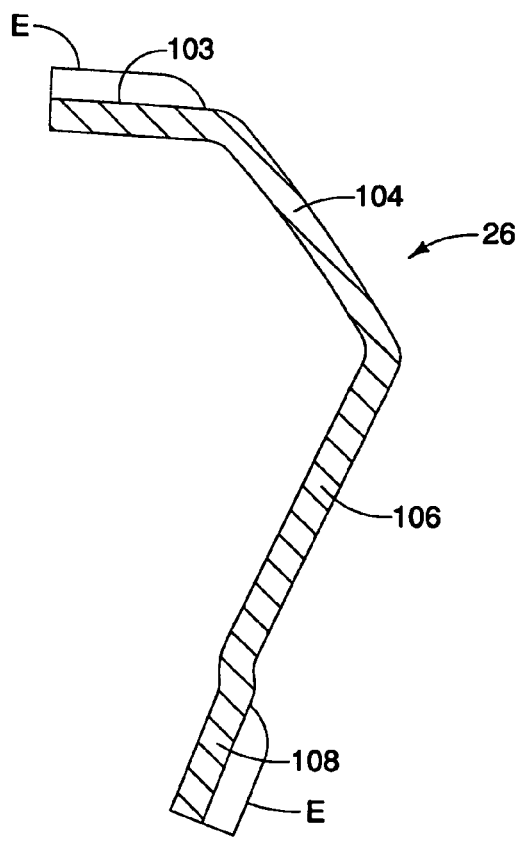
FIG. 15 is a transverse cross sectional view of the reinforcement member taken along section line 15-15 in FIG. 14.

With specific reference now to FIGS. 14 and 15, the reinforcement member 26 is now described in greater detail. The reinforcement member 26 is a longitudinally extending member that has generally U-shaped cross section as shown in FIG. 15 that extends generally perpendicular to the center pillar outer panel 82. The reinforcement members 26 is fixedly coupled to at least one of the roof rail inner and outer members 20 and 22 in a manner describe further below. The reinforcement member 26 extends from proximate in forward portion of the sunroof opening 44 to a point rearward of the sunroof opening 44 as indicated in FIG. 3. The reinforcement member 26 has a length $L_3$ as also shown in FIG. 3. As indicated in FIG. 3, the length $L_3$ of the reinforcement member 26 is less than the length $L_2$ of the roof side rail inner member 22 and also less than the length $L_1$ of the roof side rail outer member 20.

As shown in FIGS. 14 and 15, the reinforcement member 26 basically includes a first reinforcement member flange 103, a reinforcement member mid portion 104, an reinforcement member offset portion 106 and a second reinforcement member flange 108. The reinforcement member 26 is generally divided into several longitudinally extending sections, a forward section $S_1$, a tapered section $S_2$, a mid-section $S_3$ and a rearward section $S_4$. The first reinforcement member flange 103, the reinforcement member mid portion 104, the reinforcement member offset portion 106 and the second reinforcement member flange 108 extend throughout each of the sections $S_1$, $S_2$, $S_3$ and $S_4$. As shown in FIG. 14, the mid-section $S_3$ has a smaller overall profile than the forward section $S_1$. More specifically, in the forward section $S_1$, the distance between the first reinforcement member flange 103 and the second reinforcement member flange 108 is greater than the distance between the first reinforcement member flange 103 and the second reinforcement member flange 108 in the mid-section $S_3$. The mid-section $S_3$ of the reinforcement member 26 is disposed proximate the upper pillar portion 90 of the center pillar outer panel 82. The first reinforcement member flange 103 and the second reinforcement member flange 108 are each further formed with a plurality of longitudinally spaced apart embossments E. The embossments E define connection points or weld points between the first reinforcement member flange 103 and the second side rail outer portion 62, and the second reinforcement member flange 108 and the second offset portion 66 of the roof side rail outer member 20. The embossments E create a clearance between the majority of the roof side rail outer member 20 and the reinforcement member 26.

As shown in FIGS. 8 and 9, the first reinforcement member flange 103 is welded to or otherwise bonded to the second side rail outer portion 62. However as shown in FIG. 10, in the region of the gusset 34, the first reinforcement member flange 103 is spaced apart from the second side rail outer portion 62.

As shown in FIGS. 8 and 9, the reinforcement member mid portion 104 is spaced apart from the mid portion 64 of the roof side rail outer member 20. However, as shown in FIG. 10, in the region of the gusset 34, a section of the reinforcement member mid portion 104 is welded or otherwise bonded to the roof side rail outer member 20.

As shown in FIGS. 8, 9 and 10, the reinforcement member offset portion 106 is spaced apart from the first side offset rail outer portion 65 of the roof side rail outer member 20. The second reinforcement member flange 108 is welded or otherwise bonded to the second offset portion 66 of the roof side rail outer member 20 and to the second flange section 98 of the center pillar outer panel 82.

Figure 22:
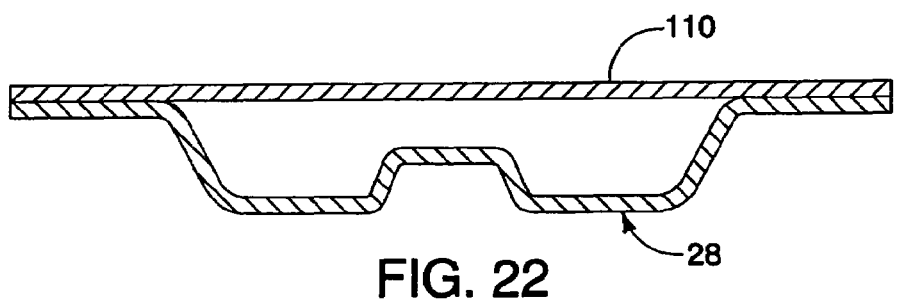
FIG. 22 is a transverse cross sectional view of a center cross member taken along section line 22-22 in FIG. 3.

Specific reference to FIGS. 4 and 22, the cross member 28 is now described in greater detail. The cross member 28 is a laterally extending member extending between the two body side outer panels 18. The cross member 28 is fixedly attached at each end thereof to a corresponding one of the roof side rail inner members 22 at a location rearward of and adjacent to the sunroof opening 44. The cross member 28 is located rearward of the pillar structure 24 as shown in FIGS. 3 and 7. The cross member 28 extends in a direction that is approximately perpendicular to the body side outer panel 18. As shown in FIG. 22, the cross member 28 has an overall U-shape viewed in cross section with a smaller inverted U-shaped reinforcing portion centrally located within the larger overall U-shape. The cross member 28 further includes a cross member reinforcement element 110 that is fixedly attached to the cross member 28 by, for example, welding.

As shown in FIG. 22, the cross member 28 and the cross member reinforcement element 110 form a closed cross-section thereby defining a sunroof center roof bow assembly positioned to extend along or adjacent to a rearward edge of the sunroof opening 44. The cross member reinforcement element 110 does not necessarily extend the full length of the cross member 28, as indicated in FIGS. 3 and 4. However, the cross member reinforcement element 110 extends a sufficient portion of the cross member 28 thereby increasing the strength of the cross member 28 reducing the amount of deformation resulting from a side impact, as well as stiffening the overall roof structure of the vehicle 10. As shown in FIG. 10, the cross member 28 extends between a segment of the side edge portion 40 of the roof panel 16 and a segment of the upper attachment flange 56 of the body side outer panel 18, being sandwiched and welded or otherwise bonded therebetween.

As shown in FIGS. 3 and 4, the bows 30 and 32 also extend between the two body side outer panels 18 rearward from the cross member 28 at prescribed spaced apart location. The bows 30 and 32 are attached to the roof side rail inner member 22 by welding or other bonding techniques.

Figure 20:
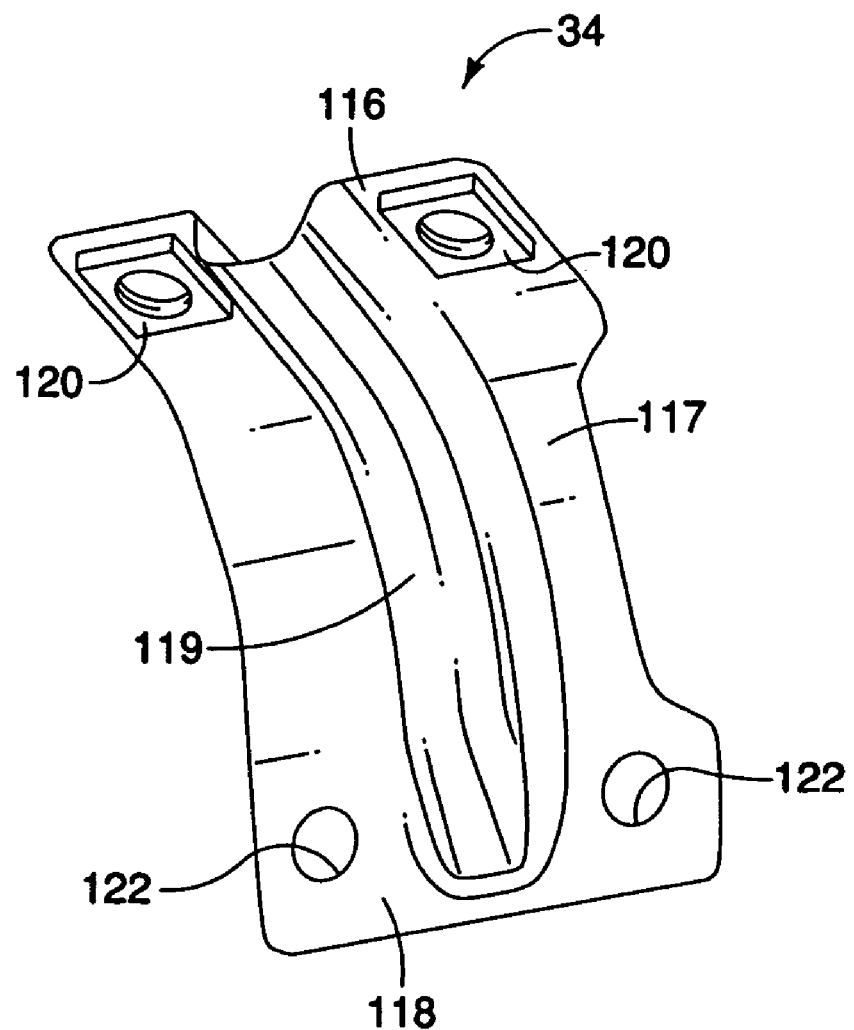
FIG. 20 is an inside perspective view of the gusset shown removed from the support structure in accordance with the present invention.

With specific reference to FIGS. 5, 6, 7, 10, 11 and 20 the gusset 34 is now described in greater detail. The gusset 34 has an arcuate shape when viewed in profile as shown in FIG. 10. The gusset 34 basically includes a first end 116, a curved portion 117 and a second end 118. The curved portion 117 extends between the first and second ends 116 and 118 and includes a U-shaped reinforcing rib 119 that extends from the first end 116 along the curved portion 117 to a point just short of the second end 118. As shown in FIG. 20, the curved portion 117 is curved with an overall shape corresponding to the arcuate shape of the curved portion 117. The first end 116 is formed with threaded fastener receiving aperture 120 which includes machine thread for receiving a fastener. The second end 118 is formed with aperture 122. The first end 116 is fixately attached to the cross member 128 by fasteners 124 which extend through the threaded fastener receiving aperture 120, as shown in FIG. 10. The second end 118 is fixedly attached to the roof side rail inner member 22 by fasteners 126 which extend through the threaded fastener apertures 76, as shown in FIG. 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
a generally horizontal roof panel having a side edge portion;
a body side outer panel fixedly coupled to the roof panel and extending generally downward from the side edge portion of the roof panel to form a corner area;
a vertically extending center pillar outer member including a generally vertical extending pillar portion and a generally horizontal extending upper pillar portion located at an upper end of the vertical extending pillar portion in the corner area, the upper pillar portion having a generally overall U-shaped transverse cross section with an upper end section and a lower end section;
a longitudinally extending roof side rail outer member having a generally overall U-shaped transverse cross section positioned at the corner area, the roof side rail outer member having a first side rail outer portion fixedly coupled to the upper end section of the upper pillar portion and a second side rail outer portion fixedly coupled to the lower end section of the upper pillar portion;
a longitudinally extending roof side rail inner member having a first side rail inner portion fixedly coupled to the first side rail outer portion and a second side rail inner portion fixedly coupled to one of the second side rail outer portion and the lower end section of the upper pillar portion;
a longitudinally extending reinforcement member having a generally overall U-shaped cross section that includes a first edge portion connected to the first side rail outer portion and a second edge portion connected to the second side rail outer portion, the reinforcement member extending generally perpendicular to the center pillar outer member; and
a center cross member extending in a generally horizontal direction beneath the roof panel and approximately perpendicular to the body side outer panel, the center cross member being longitudinally offset from a central axis of the center pillar.

2. The vehicle body structure as set forth in claim 1, wherein the roof panel includes a sunroof opening.

3. The vehicle body structure as set forth in claim 2, further comprising
a gusset having a first gusset end fixedly coupled to the center cross member and a second gusset end fixedly coupled to the roof side rail inner member with a curved portion extending between the first and second gusset ends.

4. The vehicle body structure as set forth in claim 3, wherein
the first gusset end is fixedly attached to the center cross member by a threaded fastener and the second gusset end is fixedly attached to the roof side rail inner member by another threaded fastener.

5. The vehicle body structure as set forth in claim 3, wherein
the curved portion of the gusset includes a U-shaped reinforcing rib that extends from the first gusset end along the curved portion to a point just short of the second gusset end.

6. The vehicle body structure as set forth in claim 2, wherein
the center cross member extends along an edge of the sunroof opening.

7. The vehicle body structure as set forth in claim 2, wherein
the reinforcement member extends along a portion of the sunroof opening to a point rearward of the sunroof opening.

8. The vehicle body structure as set forth in claim 7, wherein
the roof side rail outer member extends along a portion of the sunroof opening to a point rearward of the reinforcement member.

9. The vehicle body structure as set forth in claim 8, wherein
the roof side rail inner member extends from a point forward of the reinforcement member to a point rearward of the roof side rail outer member.

10. The vehicle body structure as set forth in claim 1, further comprising
a gusset having a first gusset end fixedly coupled to the center cross member and a second gusset end fixedly coupled to the roof side rail inner member with a curved portion extending between the first and second gusset ends.

11. A vehicle body structure comprising:
a generally horizontal roof panel having a side edge portion and a sunroof opening;
a body side outer panel fixedly coupled to the roof panel and extending generally downward from the side edge portion of the roof panel to form a corner area;
a vertically extending center pillar outer member including a generally vertical extending pillar portion and a generally horizontal extending upper pillar portion located at an upper end of the vertical extending pillar portion in the corner area, the upper pillar portion having a generally overall U-shaped transverse cross section with an upper end section and a lower end section;
a longitudinally extending roof side rail outer member having a generally overall U-shaped transverse cross section positioned at the corner area, the roof side rail outer member having a first side rail outer portion fixedly coupled to the upper end section of the upper pillar portion and a second side rail outer portion fixedly coupled to the lower end section of the upper pillar portion;
a longitudinally extending roof side rail inner member having a first side rail inner portion fixedly coupled to the first side rail outer portion and a second side rail inner portion fixedly coupled to one of the second side rail outer portion and the lower end section of the upper pillar portion;
a longitudinally extending reinforcement member having a generally overall U-shaped cross section that includes a first edge portion connected to the first side rail outer portion and a second edge portion connected to the second side rail outer portion, the reinforcement member extending generally perpendicular to the center pillar outer member.

12. The vehicle body structure as set forth in claim 1, further comprising
a vertically extending center pillar inner member fixedly connected to the center pillar outer member to form a closed cross section.

13. The vehicle body structure as set forth in claim 12, wherein
the center pillar inner member has an upper end fixedly connected to the roof side rail inner member.

14. The vehicle body structure as set forth in claim 13, wherein
the roof panel includes a sunroof opening.

15. A vehicle body structure comprising:
a generally horizontal roof panel having a side edge portion;
a body side outer panel fixedly coupled to the roof panel and extending generally downward from the side edge portion of the roof panel to form a corner area;
a vertically extending center pillar outer member including a generally vertical extending pillar portion and a generally horizontal extending upper pillar portion located at an upper end of the vertical extending pillar portion in the corner area, the upper pillar portion having a generally overall U-shaped transverse cross section with an upper end section and a lower end section;
a longitudinally extending roof side rail outer member having a generally overall U-shaped transverse cross section positioned at the corner area, the roof side rail outer member having a first side rail outer portion fixedly coupled to the upper end section of the upper pillar portion and a second side rail outer portion fixedly coupled to the lower end section of the upper pillar portion;
a longitudinally extending roof side rail inner member having a first side rail inner portion fixedly coupled to the first side rail outer portion and a second side rail inner portion fixedly coupled to one of the second side rail outer portion and the lower end section of the upper pillar portion; and
a longitudinally extending reinforcement member having a generally overall U-shaped cross section that includes a first edge portion connected to the first side rail outer portion and a second edge portion connected to the second side rail outer portion, the reinforcement member extending generally perpendicular to the center pillar outer member, the reinforcement member being disposed between the roof side rail outer member and the roof side rail inner member.

16. The vehicle body structure as set forth in claim 1, wherein
the reinforcement member includes a forward section and a mid-section configured such that a distance between the first and second edge portions is greater in the forward section than in the mid-section.

17. The vehicle body structure as set forth in claim 16, wherein
the mid-section of the reinforcement member is disposed proximate the upper pillar portion of the center pillar outer member.

18. The vehicle body structure as set forth in claim 1, wherein
the first and second edge portions of the reinforcement member each include a plurality of longitudinally spaced apart embossments, the embossments defining connection points between the first edge portion and the first side rail outer portion and the second edge portion and the second side rail outer portion.

19. A vehicle sunroof reinforcement structure comprising:
a roof side rail outer member having a generally overall U-shaped transverse cross section with an inwardly extending first side rail outer portion and a generally downward extending second side rail outer portion;
a roof side rail inner member having a first side rail inner portion connected to the first side rail outer portion and a second side rail inner portion connected to the second side rail outer portion to form a roof rail assembly having a closed cross section;
a cross member extending laterally inward from the roof rail assembly;
a reinforcement stiffener connected to the cross member to form a sunroof center roof bow assembly having a closed cross section;
a B-pillar fixedly coupled to the roof rail assembly with a central axis of the B-pillar being longitudinally offset along the roof rail assembly from the sunroof center roof bow assembly; and
a gusset having a first gusset end attached to the sunroof center roof bow assembly and a second gusset end attached to the roof side rail inner member.

20. The vehicle sunroof reinforcement structure as set forth in claim 19, further comprising
a roof panel having a sunroof opening, the roof panel being at least partially supported by the roof rail assembly, the sunroof center roof bow assembly extending along a rearward edge of the sunroof opening.

21. The vehicle sunroof reinforcement structure as set forth in claim 19, further comprising
a first threaded fastener fixedly attaching the first end of the gusset to the center roof bow assembly;
a second threaded fastener fixedly attaching the second end of the gusset to the roof side rail inner member.

22. The vehicle sunroof reinforcement structure as set forth in claim 20, further comprising
a reinforcement member coupled to one of the roof side rail outer and inner members and extending along a portion of the sunroof opening to a point rearward of the sunroof opening.

23. The vehicle sunroof reinforcement structure as set forth in claim 22, wherein
the roof side rail outer member extends along a portion of the sunroof opening to a point rearward of the reinforcement member.

24. The vehicle sunroof reinforcement structure as set forth in claim 23, wherein
the roof side rail inner member extends from a point forward of the reinforcement member to a point rearward of the roof side rail outer member.

25. The vehicle body structure as set forth in claim 22, wherein
the reinforcement member includes a forward section and a mid-section, the forward section being larger than the mid-section.

26. The vehicle body structure as set forth in claim 25, wherein
the mid-section of the reinforcement member is disposed proximate the B-pillar.

27. The vehicle body structure as set forth in claim 22, wherein
the reinforcement member has first and second edge portions that include a plurality of longitudinally spaced apart embossments, the embossments defining connection points between the first and second edge portions and the roof side rail outer member.

28. The vehicle body structure as set forth in claim 19, wherein
the gusset includes a curved portion extending between the first and second gusset ends, the curved portion of the gusset having a U-shaped reinforcing rib that extends from the first gusset end along the curved portion to a point short of the second gusset end.

29. A vehicle body structure comprising:
a generally horizontal roof panel having first and second longitudinal sides and a sunroof opening located between the first and second longitudinal sides;
a longitudinally extending roof side rail outer member having a generally overall U-shaped transverse cross section fixedly coupled along at least a portion of one of the first and second longitudinal sides of the roof panel to define a corner area;
a longitudinally extending roof side rail inner member fixedly coupled to the roof side rail outer member;
a body side outer panel fixedly coupled to at least one of the roof side rail inner and outer members;
a sunroof support structure disposed beneath the sunroof opening of the roof panel;
a pillar structure extending vertically downward from at least one of the roof rail inner member and the roof rail outer member adjacent to the sunroof opening;
a longitudinally extending reinforcement member having a generally overall U-shaped transverse cross section fixedly coupled to at least one of the roof side rail inner and outer members and extending along a portion of the sunroof opening to a point rearward of the sunroof opening; and
a laterally extending cross member fixedly coupled to the roof side rail inner member rearward of the sunroof opening and the pillar structure.

30. The vehicle body structure as set forth in claim 29, wherein
the pillar structure includes a vertically extending center pillar outer member and a vertically extending center pillar inner member fixedly coupled to one another.

31. The vehicle body structure as set forth in claim 30, wherein
the center pillar inner member is fixedly coupled to the roof side rail inner member and the center pillar outer member is fixedly coupled to the roof side rail outer member.

32. The vehicle body structure as set forth in claim 29, further comprising
a gusset having a first gusset end fixedly attached to the cross member, a second gusset end fixedly attached to the roof side rail inner member and a curved portion extending between the first and second gusset ends.

33. The vehicle body structure as set forth in claim 32, wherein
the first gusset end is fixedly attached to the cross member by a threaded fastener and the second gusset end is fixedly attached to the roof side rail inner member by a threaded fastener.

34. The vehicle body structure as set forth in claim 32, wherein
the curved portion of the gusset has a U-shaped reinforcing rib that extends from the first gusset end along the curved portion to a point short of the second gusset end.

* * * * *